United States Patent
Park

(10) Patent No.: US 9,126,562 B2
(45) Date of Patent: Sep. 8, 2015

(54) AIRBAG

(71) Applicant: HYUNDAI MOBIS Co., Ltd., Yongin-si, Gyeonggi-do (KR)

(72) Inventor: Hae Kwon Park, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/149,870

(22) Filed: Jan. 8, 2014

(65) Prior Publication Data

US 2015/0137495 A1    May 21, 2015

(30) Foreign Application Priority Data

Nov. 18, 2013 (KR) .......................... 10-2013-0140073

(51) Int. Cl.
*B60R 21/26* (2011.01)
*B60R 21/2342* (2011.01)

(52) U.S. Cl.
CPC ............. *B60R 21/2342* (2013.01); *B60R 21/26* (2013.01)

(58) Field of Classification Search
CPC ............................ B60R 21/2343; B60R 21/26
USPC ............................... 280/737, 736, 740, 743.1
See application file for complete search history.

(56) References Cited

FOREIGN PATENT DOCUMENTS

| EP | 841226 A1 * | 5/1998 | ............. B60R 21/28 |
|---|---|---|---|
| JP | 2001-310701 | 11/2001 | |
| JP | 4423738 | 3/2010 | |

\* cited by examiner

*Primary Examiner* — Faye M Fleming
(74) *Attorney, Agent, or Firm* — Sherr & Jiang, PLLC

(57) ABSTRACT

The present invention relates to an airbag including: an inflator; and an airbag cushion which is deployed by gas flowing into the airbag cushion from the inflator, in which the airbag cushion has a burst portion at least a part of which is torn from the airbag cushion so as to form a burst hole through which gas flowing into the airbag cushion is discharged to the outside.

14 Claims, 5 Drawing Sheets

(a)          (b)          (c)

AIRBAG

CROSS-REFERENCE TO RELATED APPLICATIONS

The present application claims priority to Korean Patent Application Number 10-2013-0140073 filed Nov. 18, 2013, the entire contents of which the application is incorporated herein for all purposes by this reference.

TECHNICAL FIELD

The present invention relates to an airbag, and more particularly, to a structure for absorbing impact energy by adjusting internal pressure of an airbag installed in a vehicle.

BACKGROUND

In general, various safety devices for protecting passengers are provided in a vehicle so as to prepare for an unexpected situation that may occur at uncertain moments, and as the representative safety devices, an internal airbag for protecting the passenger and an external airbag for protecting a person colliding with the vehicle are installed in the vehicle.

However, the airbags do not sufficiently absorb impact energy because of an instantaneous deployment, and as a result, the passenger or the person colliding with the vehicle may be greatly injured.

Therefore, in order to absorb impact energy, the airbag has a structure in which an active vent concept of the existing airbag is applied, and particularly, in the case of a fellow passenger seat, vents such as a low risk deployment (LRD) vent, a general vent, and an active vent are installed together in a single side panel in order to satisfy marketability/performance set forth in the regulation. Particularly, the active vent refers to a device that adjusts internal pressure of an airbag of a front passenger seat when the airbag is deployed, and has structural characteristics of being opened and closed based on each purpose or deployment time.

FIG. 1 relates to an external airbag 10, and illustrates, as drawings, contact models in which a person collides with the vehicle at the front of the vehicle in various collision modes. FIGS. 1A to 1C each illustrates a model of collision with a stationary wall, a model of collision with a pole, and an offset collision. Vehicle collisions may occur in various manners in addition to the aforementioned modes, but the above three collision modes are generally representative of the various manners.

The active vent is opened when internal pressure of an airbag cushion is a predetermined value or more so as to induce a variation in internal pressure of the airbag cushion. In the active vent, a tether releasing structure is a device that forcibly opens the vent, and a separate explosive device is additionally provided at a cushion retainer.

Here, there is a problem in that when the active vent of a passenger airbag is applied to the external airbag, component cost is increased, and an assembly process is complicated.

In addition, there is a problem in that energy, which is transferred from a collision body, is not sufficiently absorbed due to damage to the airbag cushion and an undesirable increase in pressure at the time of a collision mode test as illustrated in FIG. 1.

SUMMARY

The present invention has been made in an effort to provide an airbag capable of sequentially adjusting internal pressure of an airbag cushion using a simple structure.

Technical problems of the present invention are not limited to the aforementioned technical problems, and other technical problems, which are not mentioned above, may be clearly understood by those skilled in the art from the following descriptions.

An exemplary embodiment of the present invention provides an airbag including: an inflator; and an airbag cushion which is deployed by gas flowing into the airbag cushion from the inflator, in which the airbag cushion has a burst portion at least a part of which is torn from the airbag cushion so as to form a burst hole through which gas flowing into the airbag cushion is discharged to the outside.

Meanwhile, the burst portion may have a tear line formed at the periphery thereof, and the tear line may be formed by a plurality of slits that is spaced apart from each other.

In addition, the number of burst portions is two or more, and the plurality of burst portions at least includes a burst portion which has a tear line having different slit lengths and/or different slit intervals.

The plurality of burst portions at least may have a tear line having a different shape.

The airbag cushion may have an opening portion having a predetermined size, a reinforcing member, which covers the opening portion, may be attached to the airbag cushion, and the burst portion may be formed at the reinforcing member.

In addition, a vent hole may be formed in the burst portion, and the vent hole may be formed at a center of the burst portion, or may be eccentrically formed in the burst portion.

In addition, the tear line may be formed in a ring shape, or may be formed to include a corner portion having a predetermined angle.

According to the airbag for a vehicle of the present invention, there are one or more effects as follows.

Firstly, the airbag for a vehicle according to the present invention has a function of adjusting internal pressure of the airbag cushion based on a deployment time difference, thereby implementing a structure for efficiently absorbing energy.

Secondly, the airbag for a vehicle according to the present invention may control internal pressure in the airbag cushion using a structure of the airbag cushion without a separate internal pressure adjusting device.

Thirdly, the airbag for a vehicle according to the present invention has the same work process as the existing airbag.

Fourthly, the airbag for a vehicle according to the present invention does not require a separate tether or device, thereby reducing the number of components.

Therefore, as described above, by improvement in performance, convenience, simplification of processes, reduction in number of components, and reduction in weight, costs may be reduced.

The effects of the present invention are not limited to the aforementioned effects, and other effects, which are not mentioned above, will be clearly understood by those skilled in the art from the claims.

BRIEF DESCRIPTION OF THE DRAWINGS

FIG. 3 is a cross-sectional view taken along line A-A of FIG. 2, in which

DETAILED DESCRIPTION

Figure 1:
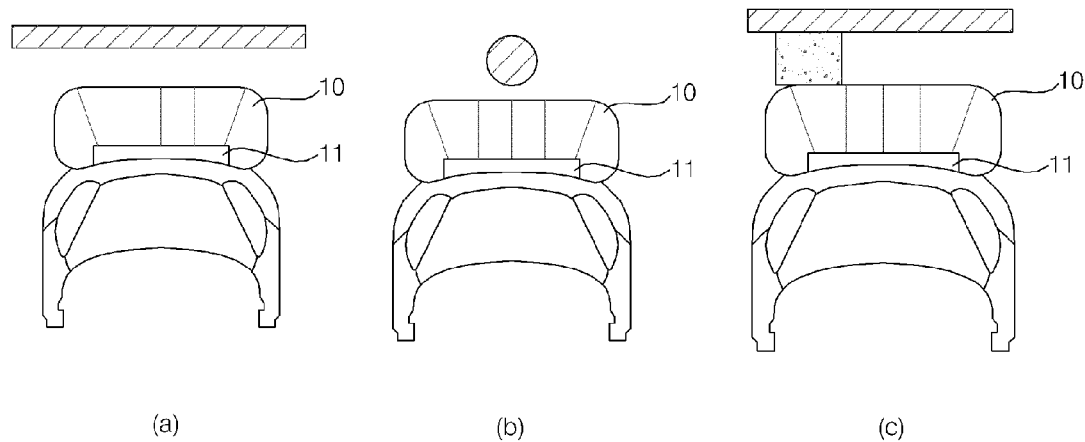
FIG. 1 is a top plan view illustrating an example of an airbag collision test.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, the present invention will be described with reference to the drawings for explaining an airbag for a vehicle according to exemplary embodiments of the present invention.

Figure 2:
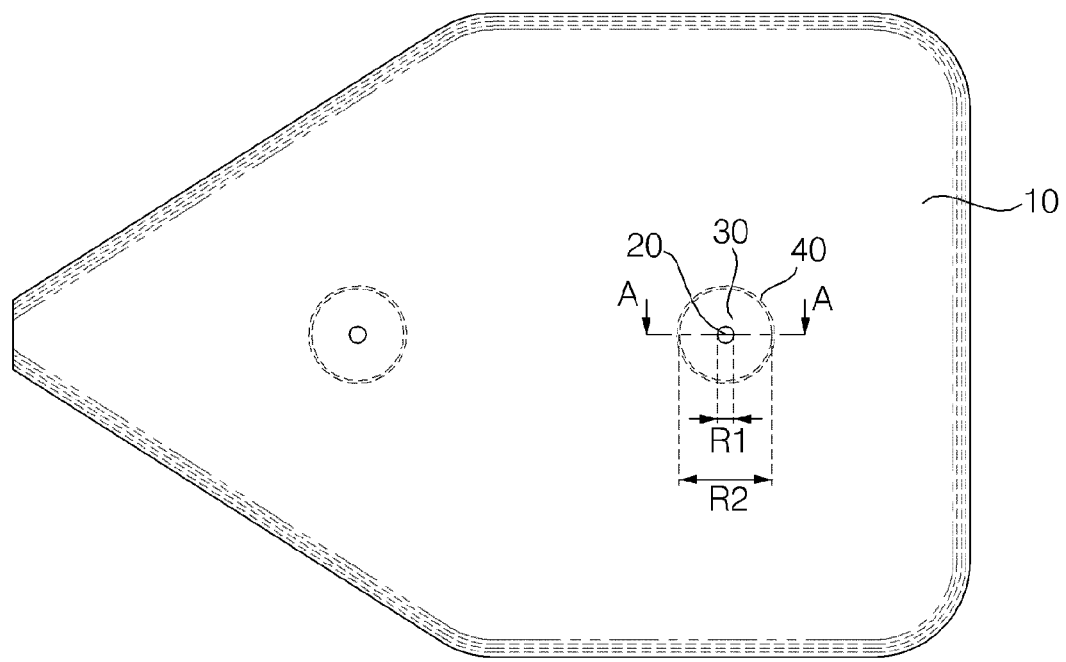
FIG. 2 is a top plan view illustrating a first exemplary embodiment of an airbag according to the present invention.
Figure 3A:
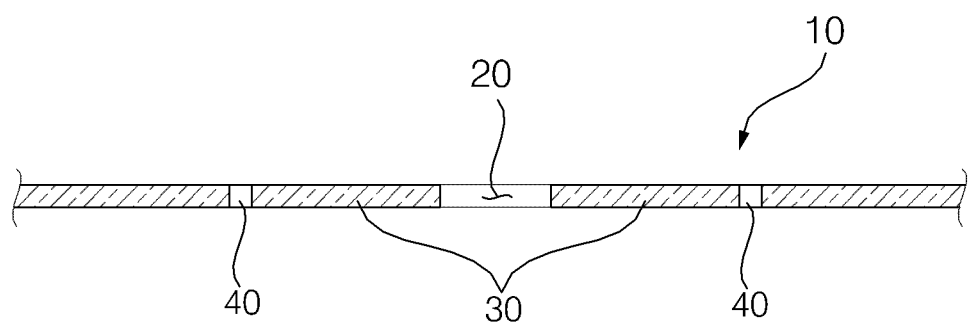
FIG. 3A illustrates a 1-1 exemplary embodiment.
Figure 3B:
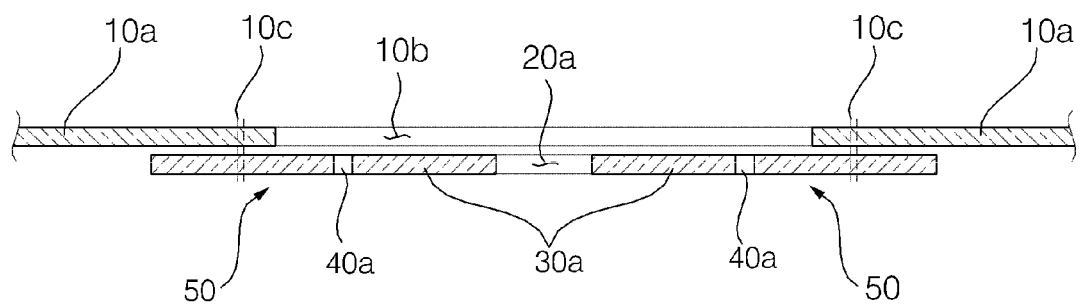
FIG. 3b illustrates a 1-2 exemplary embodiment.
Figure 4:
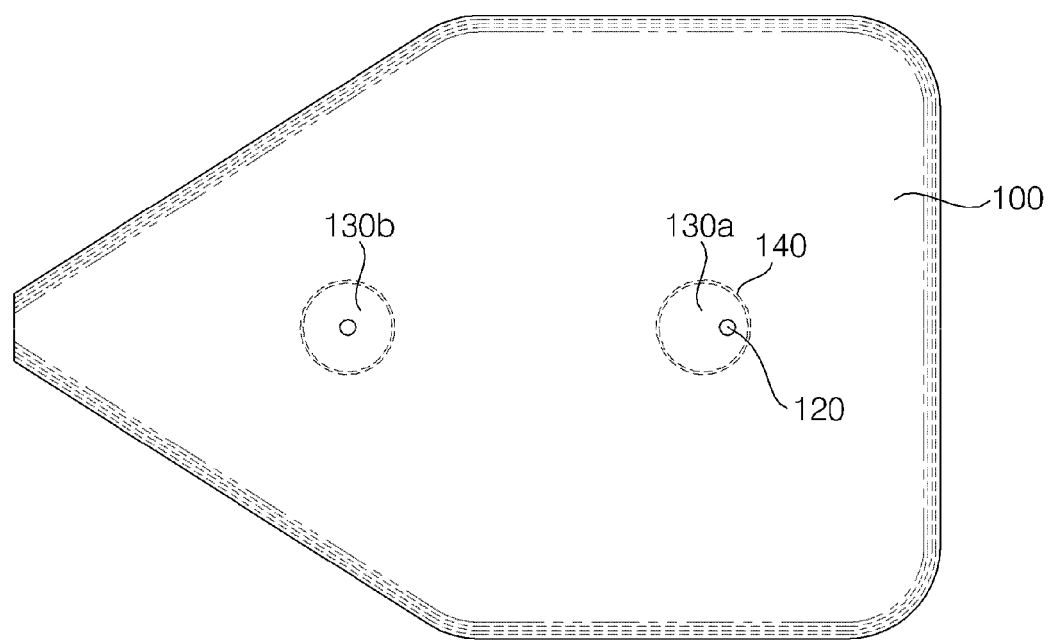
FIG. 4 is a top plan view illustrating a second exemplary embodiment according to the present invention.
Figure 5:
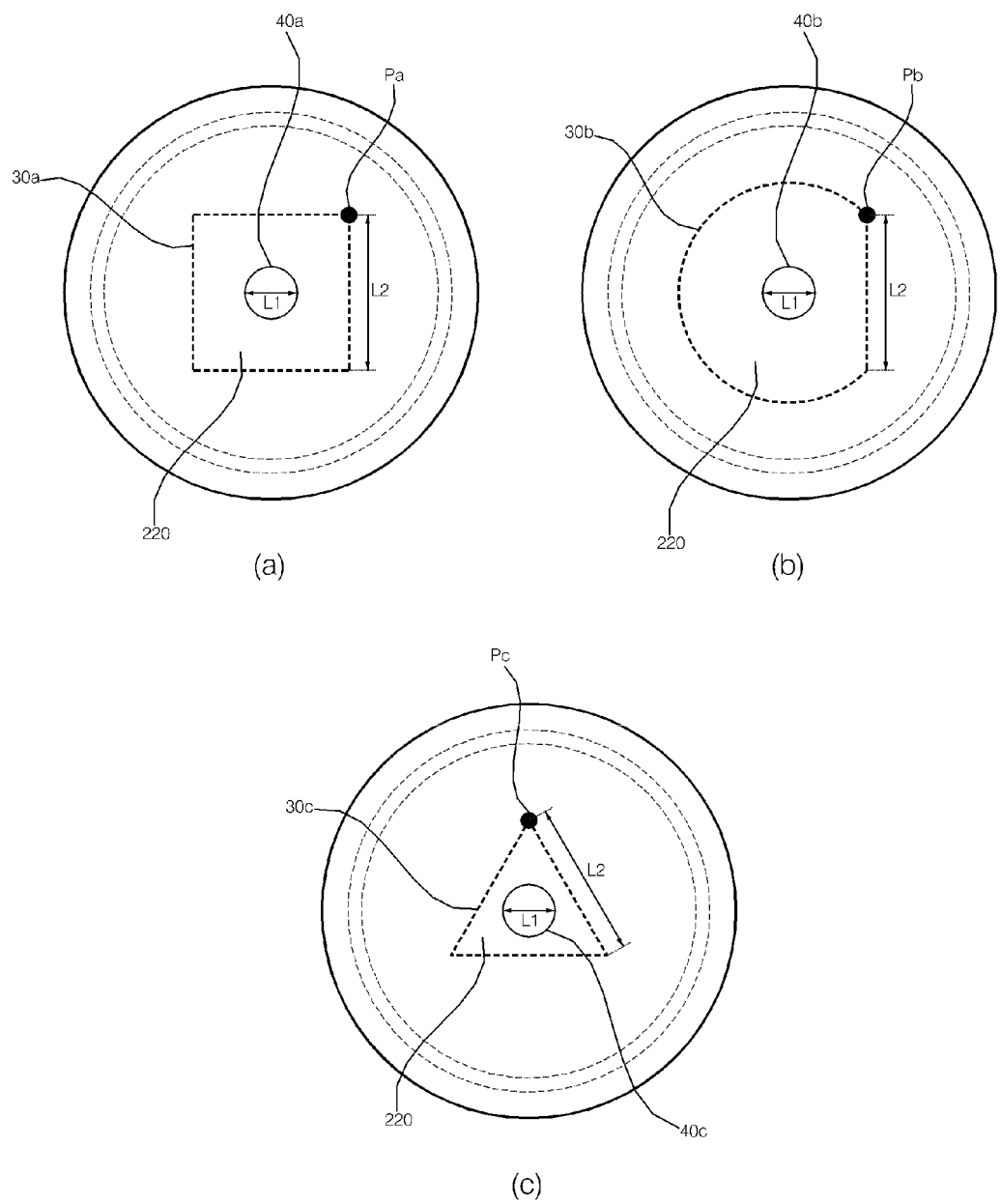
FIG. 5 is a top plan view illustrating a third exemplary embodiment according to the present invention.
Figure 6:
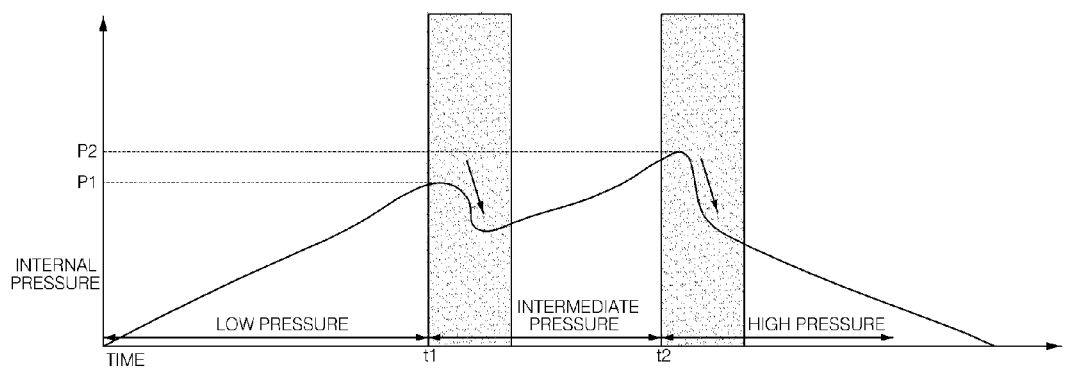
FIG. 6 is a graph illustrating a variation in internal pressure of the airbag according to the present invention.

FIG. 1 is a top plan view illustrating an example of an airbag collision test, FIG. 2 is a top plan view illustrating a first exemplary embodiment of an airbag according to the present invention, FIGS. 3A and 3B are cross-sectional views taken along line A-A of FIG. 2, FIG. 4 is a top plan view illustrating a second exemplary embodiment according to the present invention, FIG. 5 is a top plan view illustrating a third exemplary embodiment according to the present invention, and FIG. 6 is a graph illustrating a variation in internal pressure of the airbag according to the present invention.

The airbag for a vehicle according to the exemplary embodiments of the present invention may be modified by those skilled in the art.

FIG. 2 is a top plan view illustrating the first exemplary embodiment of the airbag according to the present invention, and FIG. 3A is a cross-sectional view of a 1-1 exemplary embodiment taken along line A-A of FIG. 2.

An inflator 11 is connected to an airbag cushion 10, injects high-pressure gas into the airbag cushion 10 by an operation due to an electrical signal of a control unit, and deploys the airbag cushion 10.

A vent hole 20, which discharges high-pressure gas flowing into the airbag cushion to the outside, is formed in the airbag cushion 10. A plurality of vent holes 20 may be formed in the airbag cushion 10, or at least one vent hole 20 is formed in the airbag cushion 10 so as to adjust gas pressure in the airbag cushion 10.

The airbag cushion 10 includes a burst portion 30 which bursts to form a burst hole when internal pressure of the airbag cushion is a predetermined value or more. The burst portion 30 is formed to be greater than the vent hole 20, and the vent hole 20 may be formed at an inner center of the burst portion 30. The vent hole 20 and the burst portion 30 may form concentric circles.

The number of burst portions 30 is one or more, and a tear line 40 is formed at the periphery of the burst portion 30 so that the burst portion 30 is torn by an increase in internal pressure of the airbag cushion 10. Here, although not illustrated, the vent hole 20 may not be formed in the burst portion 30.

Based on a shape in which slits, which constitute the tear line 40, are disposed, the burst portion 30 may be torn sequentially after the burst portion 30 begins to burst from a predetermined region of the tear line 40. That is, the separation distances between the slits, which form the tear line 40, are different, such that when pressure in the airbag cushion 10 is increased, the burst portion 30 may be torn while the tear line 40 sequentially bursts from a region where the separation distance between the slits is small.

In addition, in a case in which a plurality of burst portions 30 is formed, the separation distances between the slits, which form each of the tear lines 40, are different, such that the burst portions 30 may be torn at different times when internal pressure of the airbag cushion is increased. Meanwhile, a diameter R2 of the burst portion 30 is greater than a diameter R1 of the vent hole 20, and as a result, an amount of gas, which is discharged through the burst portion 30, is larger than an amount of gas which is discharged from the vent hole 20, thereby quickly reducing high pressure in the airbag cushion.

Meanwhile, as illustrated in FIG. 3B, the burst portion and the vent hole may be formed at where a reinforcing fabric 50 is attached to an airbag cushion 10a. The reinforcing fabric 50 is attached to the airbag cushion 10a by sewing 10c the periphery of an opening portion 10b so as to cover the opening portion 10b that is formed in the airbag cushion 10a and has a predetermined size. A vent hole 20a is formed in the reinforcing fabric 50 so as to be communicated with the opening portion 10b, and a burst portion 30a is formed at an outer side of the vent hole 20a in a radial direction. A tear line 40a, which has a plurality of slits, may be formed at the periphery of the burst portion 30a, and the burst portion 30a and the tear line 40a may be formed to be positioned in the opening portion 10b.

Meanwhile, as described above, the sequence in which the tear lines 40 are torn is determined depending on lengths, sizes, shapes, and/or intervals of the slits that form the tear lines 40 and 40a. For example, the tear line in which the separation distance between the plurality of slits, which forms the tear line 40, is short, and the slits are long, bursts at lower pressure in comparison with the tear line in which the separation distance between the slits is long, and the slits are short, thereby adjusting the time difference with which the plurality of burst portions bursts.

In addition, the slits of one tear line 40 may be formed to have lengths and/or separation distances between the slits which are gradually varied, such that one point of the one tear line may burst first, and then the other points of the one tear line may sequentially burst along the one tear line.

In addition, the tear line may be formed in a ring shape, or may be formed to include a corner portion having a predetermined angle.

FIG. 4 is a top plan view illustrating a second exemplary embodiment according to the present invention.

Referring to FIG. 4, a vent hole 120 may be eccentrically formed in a burst portion 130a. Shearing force, which is applied to each tear line, is different between the burst portion 130a having the eccentric vent hole 120 and a burst portion 130b having a vent hole that is not eccentric, thereby adjusting a speed at which the tear line 140 is torn based on an eccentric distance.

FIG. 5 is a top plan view illustrating a third exemplary embodiment according to the present invention.

When describing the third exemplary embodiment with reference to FIG. 5, in a case in which corner portions having predetermined angles are formed on tear lines of burst portions 220a, 220b, and 220c, stress concentration portions Pa, Pb, and Pc, where stress is concentrated, are formed at the corner portions. The largest amount of shearing force is applied to the stress concentration portions Pa, Pb, and Pc due to internal pressure of the airbag cushion, such that the stress concentration portions Pa, Pb, and Pc burst first rather than other regions. The plurality of burst portions 220a, 220b, and 220c, which has tear lines having different shapes, has the stress concentration portions Pa, Pb, and Pc having different rigidity, thereby adjusting time when each of the burst portions bursts by forming the shapes of the tear lines to be different from each other. At least a part of tear lines 230a, 230b, and 230c may be disposed in a straight line so as to form the stress concentration portions Pa, Pb, and Pc, and a length L2 of the straight line portion may be greater than a diameter L1 of each of the burst portions 220a, 220b, and 220c.

An operation of the airbag according to the present invention, which is configured as described above, will be described below.

When the control unit transmits an airbag deployment signal to the inflator at the time of a vehicle collision, high-pressure gas is discharged from the inflator. The gas flows into the airbag cushion 10 such that the airbag cushion 10 is inflated and deployed, and internal pressure of the airbag cushion 10 is changed to be low pressure, intermediate pressure, and high pressure as time passes. In this case, as pressure in the airbag cushion 10 is increased, the burst portion 30 bursts. Hereinafter, a description will be made based on the configuration in which the plurality of burst portions 30, which bursts at different times depending on a variation in internal pressure of the airbag cushion 10, is formed.

First, in a state in which the airbag cushion 10 begins to be deployed and pressure in the airbag cushion 10 is low, gas is discharged only through the vent hole 20, and pressure in the airbag cushion 10 is increased as time passes.

When a first time t1 has passed and pressure in the airbag cushion becomes the intermediate pressure, the predetermined burst portion 30 is torn to form a burst hole, and the gas in the airbag cushion 10 is discharged to the outside through the burst hole, and as a result, pressure in the airbag cushion is temporarily reduced, and thereafter, pressure in the airbag cushion is increased.

When a second time t2 has passed and pressure in the airbag cushion becomes the high pressure, the other burst portions burst, except for the burst portion 30 that has burst in the intermediate pressure state, and as a result, pressure in the airbag cushion is reduced.

While the exemplary embodiments of the present invention have been illustrated and described above, the present invention is not limited to the aforementioned specific exemplary embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

What is claimed is:

1. An airbag comprising:
   an inflator; and
   an airbag cushion which is deployed by gas flowing into the airbag cushion from the inflator,
   wherein the airbag cushion has a burst portion at least a part of which is torn from the airbag cushion so as to form a burst hole through which gas flowing into the airbag cushion is discharged to the outside,
   wherein the burst portion has a tear line formed at the periphery thereof,
   wherein the tear line is torn to form the burst hole by an increased internal pressure of the airbag cushion.

2. The airbag of claim 1, wherein the tear line is formed by a plurality of slits that is spaced apart from each other.

3. The airbag of claim 1, wherein the airbag cushion has an opening portion formed therein, and the burst portion is formed at a reinforcing member that is attached to the airbag cushion so as to cover the opening portion.

4. The airbag of claim 1, wherein a vent hole is formed at the burst portion.

5. The airbag of claim 4,
   wherein the vent hole is eccentrically disposed in the burst portion.

6. The airbag of claim 4, wherein the tear line is formed in a ring shape.

7. The airbag of claim 4, wherein the tear line has a corner portion having a predetermined angle.

8. The airbag of claim 4, wherein the airbag cushion has an opening portion formed therein, and the burst portion is formed at a reinforcing member that is attached to the airbag cushion so as to cover the opening portion.

9. An airbag comprising:
   an inflator; and
   an airbag cushion which is deployed by gas flowing into the airbag cushion from the inflator,
   wherein the airbag cushion has a burst portion at least a part of which is torn from the airbag cushion so as to form a burst hole through which gas flowing into the airbag cushion is discharged to the outside,
   wherein the burst portion has a tear line formed at the periphery thereof,
   wherein the tear line is formed by a plurality of slits that is spaced apart from each other,
   wherein the number of burst portions is two or more, and the plurality of burst portions at least includes a burst portion which has a tear line having different slit lengths and/or different slit intervals.

10. The airbag of claim 9, wherein the airbag cushion has an opening portion formed therein, and the burst portion is formed at a reinforcing member that is attached to the airbag cushion so as to cover the opening portion.

11. The airbag of claim 9, wherein a vent hole is formed at the burst portion.

12. An airbag comprising:
    an inflator; and
    an airbag cushion which is deployed by gas flowing into the airbag cushion from the inflator,
    wherein the airbag cushion has a burst portion at least a part of which is torn from the airbag cushion so as to form a burst hole through which gas flowing into the airbag cushion is discharged to the outside,
    wherein the burst portion has a tear line formed at the periphery thereof,
    wherein the tear line is formed by a plurality of slits that is spaced apart from each other,
    wherein the number of burst portions is two or more, and the plurality of burst portions at least includes a burst portion which has a tear line having a different shape.

13. The airbag of claim 12, wherein the airbag cushion has an opening portion formed therein, and the burst portion is formed at a reinforcing member that is attached to the airbag cushion so as to cover the opening portion.

14. The airbag of claim 12, wherein a vent hole is formed at the burst portion.

* * * * *